(12) United States Patent
Hove

(10) Patent No.: US 12,123,549 B2
(45) Date of Patent: Oct. 22, 2024

(54) SUPPLY SYSTEM COMPRISING CONTAINER FOR FLUID AND PUMP

(71) Applicant: Danhydra A/S, Herning (DK)

(72) Inventor: Thomas Hove, Herning (DK)

(73) Assignee: DANHYDRA A/S, Herning (DK)

( * ) Notice: Subject to any disclaimer, the term of this patent is extended or adjusted under 35 U.S.C. 154(b) by 246 days.

(21) Appl. No.: 17/728,239

(22) Filed: Apr. 25, 2022

(65) Prior Publication Data

US 2022/0341541 A1    Oct. 27, 2022

(30) Foreign Application Priority Data

Apr. 26, 2021    (DK) .............................. PA 2021 00411

(51) Int. Cl.
*F16N 7/38*     (2006.01)
*F04B 23/02*    (2006.01)
*F16N 19/00*    (2006.01)

(52) U.S. Cl.
CPC ............ *F16N 7/385* (2013.01); *F04B 23/028* (2013.01); *F16N 19/00* (2013.01)

(58) Field of Classification Search
CPC ......... F16N 7/385; F16N 19/00; F04B 23/028
See application file for complete search history.

(56) References Cited

U.S. PATENT DOCUMENTS 2,221,763 A * 11/1940 Ginter ..................... F16N 13/16
                                              417/264
2,280,708 A *  4/1942 Klein ...................... F04B 15/02
                                              222/259
2,357,030 A *  8/1944 Smith ..................... F16N 13/16
                                              417/264
(Continued)

FOREIGN PATENT DOCUMENTS

CN         209782190 U    12/2019
DE    10 2005 016 259 A1   10/2006
(Continued)

OTHER PUBLICATIONS

European Search Report, EP Application No. EP 22 16 9545, completed Sep. 2, 2022. 1 page.
(Continued)

*Primary Examiner* — Paul R Durand
*Assistant Examiner* — Michael J. Melaragno
(74) *Attorney, Agent, or Firm* — Ware, Fressola, Maguire & Barber LLP

(57) ABSTRACT

A supply system has a pump unit and a support unit adapted to fit to the inner volume of a container holding a viscous fluid such as grease. The supply system pumps viscous fluid from a container (1) having an inner opening or volume, the supply system including a pump unit (2) having a pump (21) for pumping the fluid out of the container (1), and the supply system further includes a support unit (3) with a contact surface (7) facing the fluid inside the volume of the container (1) during operation wherein the support unit (3) is secured to the pump unit (2) such that the support unit and the pump unit (3, 2) move together, and the support unit (3) is movably mounted relative to the container (1) such that the support unit and the pump unit (3, 2) move relative to the container during operation.

14 Claims, 6 Drawing Sheets

(56) References Cited

U.S. PATENT DOCUMENTS

| | | | | |
|---|---|---|---|---|
| 3,412,903 | A | * | 11/1968 | Riper, Jr. ............... B67D 7/645 222/326 |
| 3,982,669 | A | * | 9/1976 | Moore ................. F04B 23/028 222/333 |
| 4,592,491 | A | * | 6/1986 | Chollet .................. B05C 11/10 417/313 |
| 5,125,785 | A | * | 6/1992 | Langen ................ B65B 69/005 222/162 |
| 5,248,069 | A | * | 9/1993 | Consaga ............. B67D 7/0227 222/386 |
| 5,257,723 | A | * | 11/1993 | Bagung .................. B67D 7/80 222/146.2 |
| 6,863,157 | B2 | * | 3/2005 | Conley .................. F16N 27/00 184/7.4 |
| 7,513,393 | B2 | * | 4/2009 | Kotyk ..................... B67D 7/66 222/386 |
| 7,762,428 | B2 | * | 7/2010 | Scheugenpflug ....... B05C 11/10 222/53 |
| 2007/0039978 | A1 | | 2/2007 | Scheugenpflug |
| 2007/0289994 | A1 | * | 12/2007 | Kotyk ..................... B67D 7/16 222/386 |
| 2015/0204320 | A1 | * | 7/2015 | Hove ................... F04B 43/067 417/390 |
| 2017/0173613 | A1 | * | 6/2017 | Hove ....................... F16N 5/00 |
| 2019/0322521 | A1 | | 10/2019 | Enderle et al. |
| 2020/0362830 | A1 | * | 11/2020 | Hove ...................... F16N 13/08 |
| 2022/0341541 | A1 | * | 10/2022 | Hove ...................... F16N 7/385 |
| 2023/0366508 | A1 | * | 11/2023 | Hove ................. F16C 33/6622 |

FOREIGN PATENT DOCUMENTS

| | | | |
|---|---|---|---|
| DE | 10 2017 215 706 A1 | 3/2019 | |
| EP | 1754543 A2 * | 2/2007 | ............ B05C 11/10 |
| EP | 3 260 754 A1 | 12/2017 | |
| GB | 1 561 781 A | 3/1980 | |
| GB | 2 173 550 A | 10/1986 | |
| JP | 57-131698 U | 8/1982 | |
| JP | 2006-336664 A | 12/2006 | |
| JP | 2007-255701 A | 10/2007 | |
| WO | 2018/197557 A1 | 11/2018 | |
| WO | 2020/187501 A1 | 9/2020 | |

OTHER PUBLICATIONS

Machine Translation of the description in DE 102017215706A1, 14 pages.

Danish Patent and Trademark Office Search Report for Patent Application No. PA 2021 00411, completed Oct. 12, 2021, 4 pages.

Machine Translation of description of Foreign Patent Document (DE 10 2005 016 259 A1) into English language, 12 pages.

Bibliographic Data including English Abstract for Foreign Patent Document, CN 209782190U, 2 pages.

Machine translation of JP S57-131698 U, J-Plat Pat, 6 pages.

* cited by examiner

SUPPLY SYSTEM COMPRISING CONTAINER FOR FLUID AND PUMP

The present invention relates to a supply system comprising a pump unit and a support unit adapted to fit to the inner volume of a container holding a viscous fluid such as grease. The system may be applied in a centralized lubrication system where grease or oil is held and forced into a system of moving parts such as a wind turbine.

BACKGROUND ART

Containers for viscous fluids such as grease or other lubricants in lubrication systems may comprise a cylindric reservoir chamber equipped with a mechanism for sucking or pressing grease out of the chamber.

EP3260754 A1 discloses a reservoir for a lubrication system having a significant grease capacity. The grease is supplied to a reservoir chamber (2) via a channel (6, 5) in a piston rod, and the reservoir or grease chamber is positioned under the piston (3) where the chamber is filled with grease from a grease container mounted at the end of the piston rod. Hereby the grease capacity depends on the capacity of the grease container. By allowing the piston rod to project through the top of the cylinder, the amount of grease in the chamber may be detected from the position of the piston rod. A motor (8) may drive the piston up or down thereby filling and emptying the reservoir chamber (2). During operation, a pump (11) will suck lubricant from the reservoir chamber (2) and the piston (3) may force lubricant towards the suction side of the pump (11).

JPS57131698U discloses a transfer pump for pumping of grease from a container. The transfer pump comprises a pump unit (2) resting on top of a bucket-type container (1) containing grease. The pump unit comprises a suction tube (4) inserted into the container (1) in such a way that the suction mouth (7) of the suction tube (4) is positioned near the bottom of the container (1). A follower plate (9) rests on the fluid surface and during pumping of grease from the container (1) the follower plate (9) slides down the suction tube (4). The follower plate (9) is made of a relatively light material such as resin or the like and does therefore not exercise a significant pressure on the fluid surface. A display stick (11) is attached to the follower plate (9) and indicates the amount of grease which remains in the container (1).

Comparing the transfer pump of JPS57131698U to the present invention where grease is sucked directly from the upper fluid surface and into the pump, there is likely to be a significant larger waste of grease when replacing container or pump using the transfer pump of JPS57131698U. Grease will be caught inside the long suction tube (4) because grease due to its high viscosity is difficult to suck through a tube when air enters at the open end.

A problem with the known lubrication systems are a limited grease capacity and a risk of trapping air in the grease which may cause an irregular grease supply to the individual lubrication sites. The pump of the lubrication system operates poorly when taking in air, causing the pump qualities to be lost in the short-term or long-term. As filling the lubrication system with lubricant must take place at the operational site itself, which in the case of offshore wind turbines means expensive transportation etc., there is a need for a grease lubrication system which reduces such servicing.

The present invention provides an improved supply system for lubrication, where the container does not need replaceable parts during filling thereby reducing the price for service and where the container may be emptied almost completely i.e. less than 3% of viscous fluid filled into the container will remain in the container after the container has been emptied during operation.

SUMMARY OF INVENTION

According to a first aspect of the invention, the invention relates to a supply system for pumping viscous fluid from a container (1) having an inner opening or volume, the supply system comprises a pump unit (2) comprising a pump (21) for pumping the fluid out of the container (1), and the supply system further comprises a support unit (3) comprising an outlet (4) for fluid from the container (1), a first contact surface (6) facing the pump unit (2) and being in contact with the pump unit (2) during operation, fastening means (8) configured to fasten the support unit (3) to the pump unit (2) during operation, a second contact surface (7) facing, and optionally being in contact with the fluid inside the inner opening or volume of the container (1) during operation, wherein the support unit (3) is secured to the pump unit (2) such that the support unit and the pump unit (3, 2) move together, and the support unit (3) is movably mounted relative to the container (1) such that the support unit and the pump unit (3, 2) move relative to the container during operation.

That the support unit 3 moves together with the pump unit 2 means that the support unit 3 is secured or attached to the pump unit 2 so the two units 3, 2 move in the same direction with the same speed. The support unit 3 is normally not elastic or extendable in the direction of movement, so the length of the support unit 3 in this direction is therefore normally constant. The support unit 3 may be variable or extendable and/or decreasable in a direction more or less perpendicular to the direction of movement in order for the perimeter of the support unit 3 to adapt to the inner surface of the walls of the container 1 thereby maintaining a sliding contact during operation.

The second contact surface 7 may generally have the same area as the opening in the container 1 minus or except the area removed for the outlet 4 and other openings.

According to any embodiment of the invention, the container (1) to be emptied may be a bucket-type container having an upward opening of the same or similar size as the cross-section of the inner volume of the container (1). "Similar size" means that the size of the upward opening is at least the same size as the cross-section of the inner volume and of the same shape.

According to any embodiment of the invention, the outer perimeter of the support unit (3) may correspond to the inner surfaces of the opening of the container (1) in shape and size.

According to any embodiment of the invention, the supply system may during operation be arranged or configured with the pump unit (2) positioned on top of the container (1), i.e. gravity may force the pump unit (2) and the support unit (3) toward the fluid.

According to any embodiment of the invention, the pump (21) may be a positive displacement pump comprising an inlet for fluid corresponding to the outlet (4) of the support unit (3) and an outlet (5) for fluid.

According to any embodiment of the invention, the container (1) may comprise an end part (9) and one or more side wall(s) (10) fixed to each other, and the end part (9) and side wall(s) may together form an inner volume or opening for holding the viscous fluid, the inner opening may have either a constant cross-section through the complete length or a varying e.g. decreasing cross-section in the direction from the outlet (4) to the end part(s) (9).

According to any embodiment of the invention, the perimeter of the support unit (3) of the container (1) may comprise guiding means dedicated to directing the support unit (3) from a start position at a first end of the side wall(s) (10) to a second or an opposite end of the side wall(s) (10).

According to any embodiment of the invention, the support unit (3) may comprise a central part and a plurality of movable or displaceable units (12) positioned at or along the perimeter of the central part which movable units (12) may move in a radial direction relative to the center of the central part during operation thereby increasing the periphery of the support unit (3).

According to any embodiment of the invention, the support unit (3) may comprise a centralized lower plate (14) which centralized lower plate (14) comprises guiding means (16) adapted to fit corresponding guiding means (15) of each movable unit (12).

According to any embodiment of the invention, the fastening means (8) of the support unit (3) and the corresponding fastening means of the pump unit (2) may either be releasable fastening means, i.e. the fastening means may be released manually or by a manual tool, or the fastening means may be un-releasable, i.e. the fastening means may not be released manually or by a manual tool instead it may be necessary to destroy the fastening means to separate the two units (3, 2).

According to any embodiment of the invention, the releasable fastening means may comprise corresponding threads on respectively the support unit (3) and the pump unit (2), or the releasable fastening means may comprise one or more corresponding opening(s) in the pump unit (2) and the support unit (3) to be joint by through-going bolt(s).

According to any embodiment of the invention, the pump unit (2) may comprise a housing at least comprising side wall(s) (28) and a top part (2) forming an enclosure inside which enclosure the pump (21) and further equipment supporting pumping are positioned.

According to any embodiment of the invention, one or more switches or buttons for activating and controlling the pump (21) may be positioned on the outside of the housing.

According to any embodiment of the invention, the support unit (3) may comprise a plurality of movable or displaceable units (12) e.g. between 4 and 100, preferably between 8 and 80, where each movable unit (12) may be forced into a forward position by an elastic force and forced toward a backward position by the contact between each movable or displaceable unit (12) and the wall(s) of the inner volume of the container (1).

According to any embodiment of the invention, the support unit (3) may be movably mounted relative to the container (1) being configured to follow the surface of, i.e., move together with, the viscous fluid as fluid is emptied out of the container (1).

According to any embodiment of the invention, the outer perimeter of the support unit (3) may correspond to the inner opening of the container (1) in shape and size.

According to any embodiment of the invention, the supply system during operation may be arranged or configured with the pump (2) positioned on top of the container (1) and on top of the surface (6) of the support unit (3), in such a way that gravity forces or presses the pump (2) against the support unit (3).

According to any embodiment of the invention, the pump (21) may be a positive displacement pump comprising an inlet for fluid corresponding to the outlet (4) of the support unit (3) and an outlet (5) for fluid.

According to any embodiment of the invention, the perimeter of the support unit (3) of the container (1) may comprise guiding means dedicated to guide the support unit (3) from a start position at a first end of the side wall(s) (10) to a second or an opposite end of the side wall(s) (10) at or close to the end wall (9).

According to any embodiment of the invention, the inner opening of the container may be configured with a round or polygonal or oval cross-section or profile.

According to any embodiment of the invention, the support unit (3) may comprise a centralized surface (11), and a plurality of movable or displaceable units (12) positioned at or along the perimeter of the centralized surface (11) which movable units (12) may move in a radial direction relative to the center of the centralized surface during operation thereby increasing the periphery of the support unit (3).

According to any embodiment of the invention, the support unit (3) may comprises both a centralized upper surface (11) and a centralized lower surface (14) which centralized lower surface (14) comprises guiding means (16) adapted to fit corresponding guiding means (15) of each movable unit (12).

According to any embodiment of the invention, the support unit (3) may constitute a cohesive and/or fluid tight surface at any position during operation. Normally, the support unit (3) may travel in a direction along the side wall (10) from a first end, i.e. an open end, to an opposite end closed by the end part (9).

According to a second aspect of the invention, the invention relates to a centralized lubrication system comprising a supply system according to the first aspect.

BRIEF DESCRIPTION OF THE DRAWINGS

Throughout the application identical or similar elements of different embodiments are given the same reference numbers.

Definitions of Words

In general—when this expression is used in respect of a feature, the feature may be employed with any embodiment of the invention, even though the specific mentioning of the feature appears in the detailed part of the description.

During operation—is a state where the pump is attached to the container and fluid could be or is being pumped out of the container.

Pre- or post-operation—are two states where the pump may not be attached/fixed to the container, in a first state, pre-operation, the container is filled with fluid and in a second state, post-operation, the container has been at least partly, possibly fully, emptied for fluid.

DETAILED DESCRIPTION OF INVENTION

Figure 1:
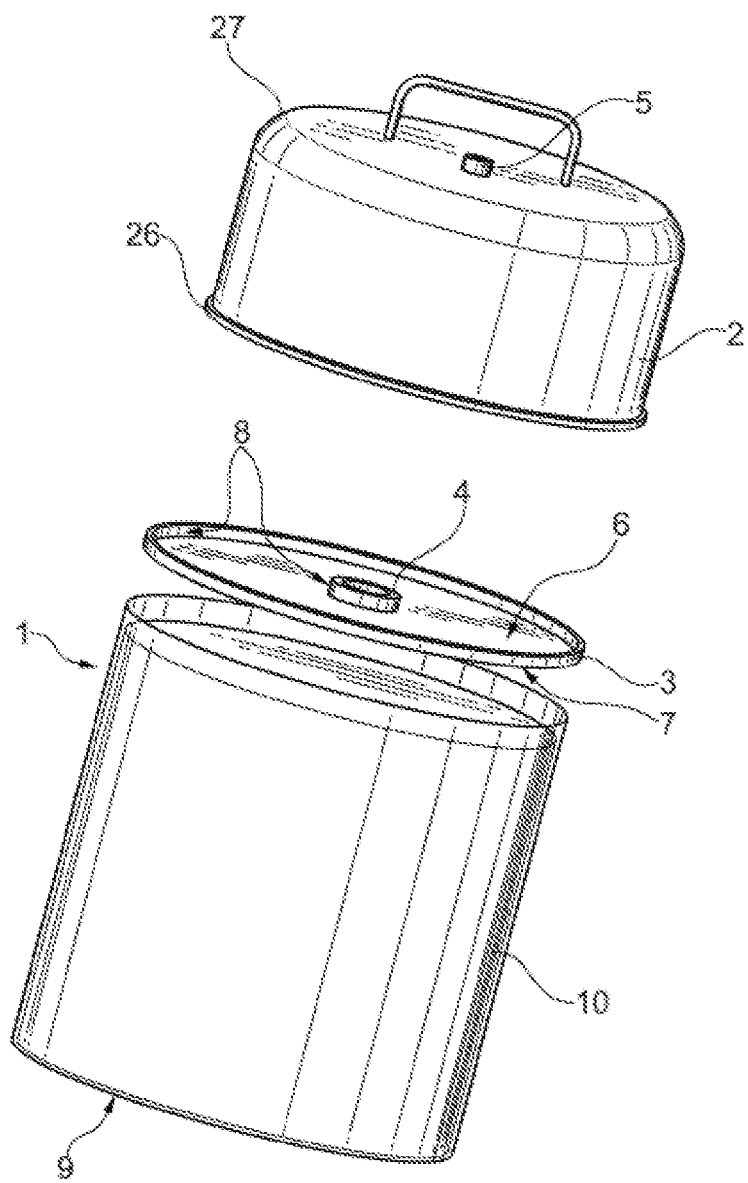
FIG. 1 discloses an exploded view of a first embodiment of a supply system according to the invention.

FIG. 1 discloses an exploded view of a first embodiment of a supply system according to the invention, this view shows how the parts of the supply system according to the invention may relate to each other.

A supply system according to the invention is during operation attached to or in contact with a container 1 comprising an inner opening or volume for fluid. The supply system comprises a pump unit 2 for pumping fluid out of the container 1 and a support unit 3. The pump unit 2 is fixed/attached to or at least in contact with the support unit 3 during operation, that is, while fluid is being or may be pumped out of the container 1. The support unit 3 comprises an outlet for fluid 4 which is an inlet to the pump unit 2, a first contact surface 6 facing the pump unit 2, fastening means 8 configured to fasten the support unit 3 to the pump unit 2, a second contact surface 7 facing and normally being in contact with the fluid inside the container 1 and optionally comprising fastening means or guiding means configured to fasten the support unit 3 and to keep the support unit 3 in correct position relative to the wall(s) 10 of the container 1.

In the embodiment of FIG. 1, the fastening means 8 may comprise corresponding threads either positioned as an inward thread on the support unit 3 corresponding to an outward thread on the bottom part 26 of the pump unit 2 or positioned as an outward thread on a centralized part of the support unit 3 corresponding to an inward thread on centralized part of the bottom part 26 of the pump unit 2. Alternatively, the fastening means 8 may comprise corresponding openings in respectively the support unit 3 and the bottom part 26 of the pump unit 2 through which corresponding openings a bolt is inserted.

The container 1 to be used with the supply system of the present invention may comprise a stationary end part 9 and a side wall part 10, which two parts are fixed to each other, e.g. molded together, and together form an inner opening or volume for the fluid. The inner opening or volume may have a constant cross-section, a decreasing cross-section or an increasing cross-section through the complete length of the inner opening, i.e. from top to bottom of the inner opening, allowing for the support unit 3 to pass through the inner opening while being in close contact e.g. sliding contact, with the inner surfaces of the inner opening.

In general, the outer perimeter of the support unit 3 may be configured to correspond to the inner surface of the inner opening of the container 1 in both shape and size. The outer perimeter of the support unit 3 may be either constant, e.g. rigid, or the outer perimeter may be configured to adapt, e.g. be flexible, to a varying inner cross-section of the inner opening or volume.

E.g., a flexible sealing or the like may be placed at the periphery or along the perimeter of the support unit 3, i.e. between the support unit 3 and the inner surface of the inner opening of the container 1 during operation, to adapt the periphery of the support unit 2 to the inner surface of the inner opening of the container 1.

Alternatively, the outer perimeter of the support unit 3 may be of a variable size. If the outer perimeter of the support unit 3 is of variable size, the support unit 3 may be configured to adapt to a changing, possibly decreasing and/or increasing cross-section of the inner opening or volume of the container 1, as the support unit 3 is moved toward the end part 9, during operation the end part 9 is normally the lowest point of the container 1.

Figure 2:
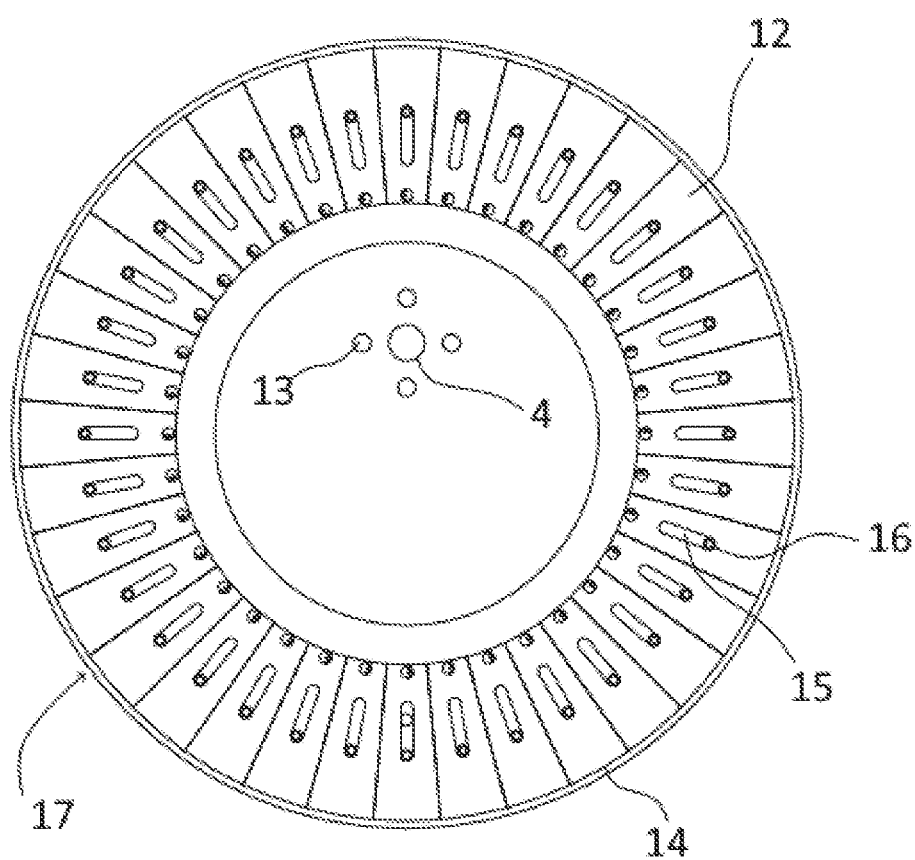
FIG. 2 discloses a second embodiment of a support unit of a supply system according to the invention in a minimum state.
Figure 3:
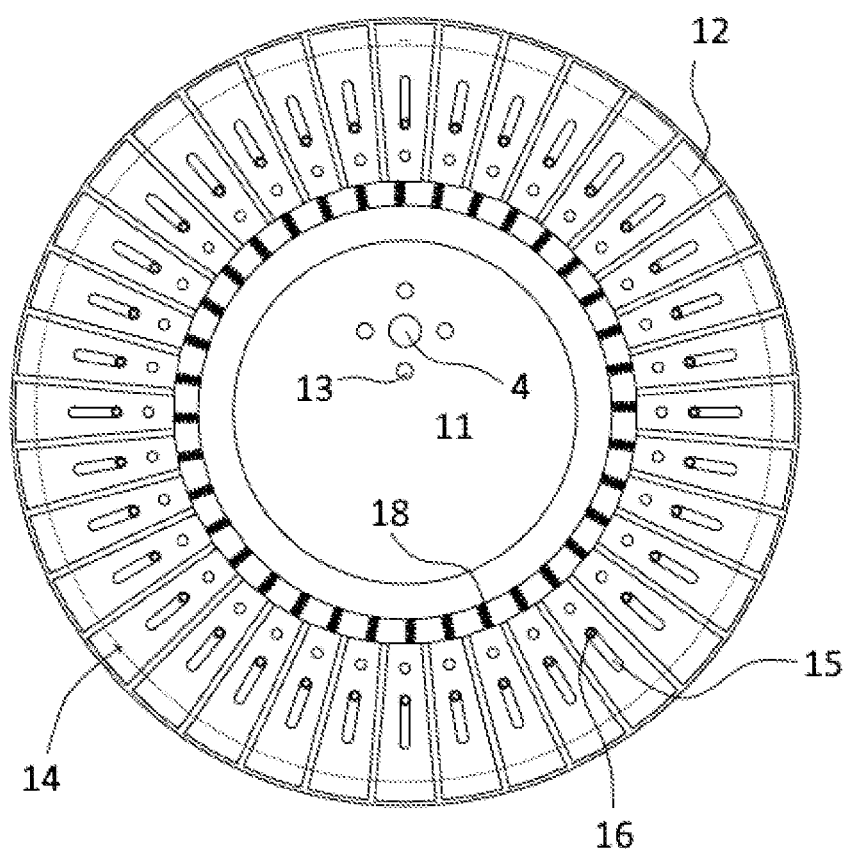
FIG. 3 discloses the second embodiment of a support unit of a supply system according to the invention in a maximum state.
Figure 4C:
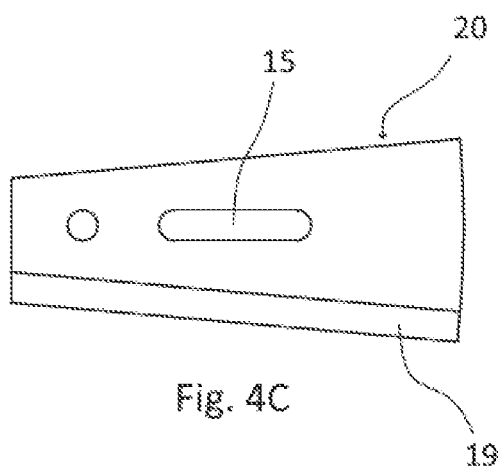
FIGS. 4A, 4B, 4C and 4D disclose an embodiment of a movable unit according to the invention.
Figure 4D:
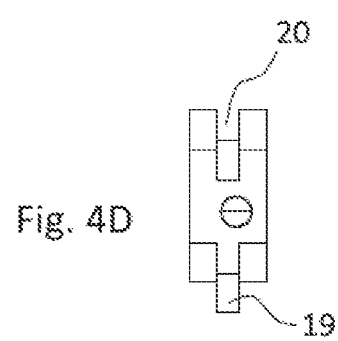
Figure 4B:
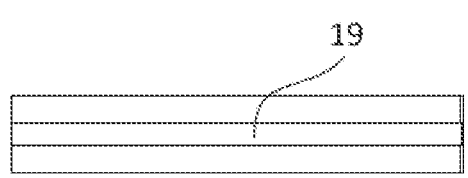
Figure 4A:
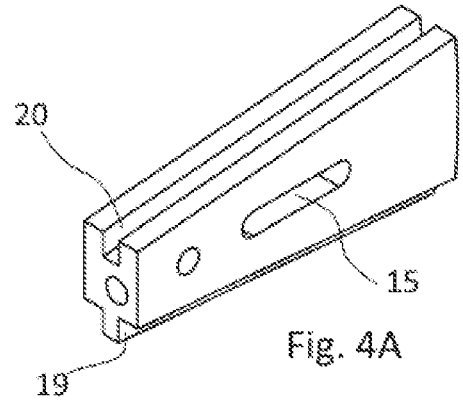

An embodiment of a support unit 3 having a variable outer diameter is disclosed in FIGS. 2 and 3, where FIG. 2 illustrates the embodiment in a first state where the circumference or perimeter is minimal, and FIG. 3 illustrates a second state of the support unit 3 where the circumference or perimeter of the support unit 3 is as large as possible.

The embodiment of the support unit 3 disclosed in FIGS. 2 and 3 comprises two centralized plates, a lower centralized plate 14 which lower plate is normally closest to the end part 9 of the container 1 during operation, and an upper centralized plate 11 which upper plate is normally closest to the pump unit 2 during operation. Between the lower and the upper plate 14, 11 is a central part positioned which is at least partly surrounded by a plurality of movable or extendable parts which movable or extendable parts are configured to move or extend radially from the central part in a plane parallel to and between the upper and the lower centralized plates. The embodiment disclosed in FIGS. 2 and 3 comprises a plurality of movable units 12 which movable units 12 together form a fluid tight surface in all states i.e. in the first state and in the second state and in all states between the first and the second state, more exactly the shown embodiment comprises 36 movable units 12.

In general, each movable units 12 may slide or extend in a radial direction while maintaining a cohesive or fluid tight surface, such a radial movement of the plurality of movable units may be obtained by positioning a first spring 18 between the central part and each movable unit 12, while the lower centralized plate 14 and/or the upper centralized plate may comprise guiding means 16 which during operation cooperates with corresponding guiding means 15 of the movable unit(s) to define or limit the movement of each movable unit 12 in a radial direction, either outwards or inwards. According to the embodiment of FIGS. 2 and 3, the guiding means 16 of the lower plate 14 is constituted by a pin 16 extending perpendicularly from the surface of the lower plate 14 while the corresponding guiding means 15 of the movable unit 15 is constituted of a radially extending opening or slit.

One or more springs 18 may be placed between the central part and each of or a group of movable unit(s) 12. In this position, the one or more springs 18 provide a constant outward force pushing the outer periphery of the movable units 12 towards the inner surface of the container 1, thereby adapting the outer periphery to variations in the size and possibly also the shape of the inner surface of the container 1.

The central part of the support unit 3 shown in FIGS. 2 and 3 comprises an outlet opening 4 for viscous fluid. The outlet opening 4 is surrounded by openings 13 which may be used for fastening means 8 for fastening the pump unit 2 releasably or unreleasably to the support unit 3. The lower and upper centralized plates 11, 14 may have corresponding openings 4, 13.

A sealing 17 may be placed at the outer periphery of each of the movable units 12. Optionally, a round-going elastic sealing extending along the outer perimeter or periphery of the support unit may cover all movable units 12 of the support unit 3, thereby the sealing 17 may exert an inward pressure, this inward pressure may though be smaller than the outward pressure exerted by the spring(s) 18.

FIGS. 4A, 4B, 4C and 4D illustrate an embodiment of one movable unit 12 from four different views. This embodiment comprises or is constituted of a body having an increasing dimension or width from the end being closest to the central part of the support unit 3 during operation to the end being furthest away from the central part of the support unit 3. The body comprises a slit or opening 15 adapted to fit with guiding means 16 of the lower plate 14. Alternatively, the guiding means 16 may be secured to or be part of the upper plate 11.

At one side, the body of the movable unit 12 comprises or is provided with a tongue 19 and at the opposite or second side the body comprises or is provided with a groove 20. The width of the tongue 19 and the groove 20 are adapted to the distance which appears between two neighboring movable units 12 when the movable units 12 are forced or pushed radially away from the center of the support unit 3 by the springs 18. The groove 20 and tongue 19 construction of the movable units 12 both provides guidance for the movable units 12 in the direction perpendicular to the slit 15 and also provides a cohesive or fluid tight surface during operation. Alternatively, two neighboring movable units 12 may be joined by an elastic material which elastic material would be able to provide a fluid tight surface between neighboring movable units 12.

In general, the support unit 3 during storing may be configured to constitute a closure or lid for the container 1 when the container 1 is of the bucket type having an opening having a cross-section similar to the cross-section of the inner volume of the container 1.

In general, the surface of the inner opening or volume of the container 1, i.e., the inner surface of the side wall 10, may be scraped free of fluid at the physical contact between the support unit 3 and the side wall 10 during operation.

The fastening means 8 configured to fasten the support unit 3 to the pump unit 2 are normally releasable and allow for separation of the pump unit 2 from the support unit 3 in a pre- or post-operation situation or possibly in a maintenance situation, i.e., it is possible to store the pump unit 2 and the support unit 3 separately before use, i.e., pre-operation, and it is possible to separate the pump unit 2 and the support unit 3 after use and, e.g., replace an empty container with a filled container 1.

Alternatively, the fastening means 8 configured to fasten the support unit 3 to the pump unit 2 can be unreleasably locked together constituting an assembly. In this case, the two parts, i.e., the pump unit 2 and the support unit 3 may not be separated without violating and/or destroying the assembly.

In general, the fastening means 8 fastening the pump unit 2 to the support unit 3 may comprise corresponding threads on respectively the pump unit 2 and the support unit 3. Such corresponding threads may either be placed along the outer edge of the pump unit 2 and the support unit 3 as indicated in FIG. 1, or alternatively it may be placed centrally along the outer edge of the outlet 4 for fluid.

The support unit 3 may further comprise fastening means for fastening the support unit 3 to the container 1, such fastening means may be constituted of an inwardly protruding edge positioned at the open end of the container, which protruding edge may be combined with a sealing part. Such an inwardly protruding edge will prevent the support unit 3 from being pushed out of the opening during filling of the container 1.

Normally, the support unit 3 is movably mounted relative to the container 1 and the support unit 3 is configured to follow or rest on the surface of fluid as fluid is emptied out of the container 1. This feature allows maintaining of a close contact between the inner surface of the opening of the container 1 and the support unit 3 while pumping fluid out of the container. Alternatively, the container 1 may be deformed in a longitudinal direction during operation i.e. when fluid is pumped out of the container 1.

During operation of the system, i.e. on site, an assembly comprising a pump unit 2 and a support unit 3 may be positioned on top of the fluid of a container 1. When the pump unit 2 is positioned on the support unit 3 on top of the fluid of the container 1, the pumping function of the assembly will be supported by gravity.

The pump 21 of the pump unit 2 may be a positive displacement pump comprising an inlet for fluid and an outlet 5 for fluid, e.g. the pump unit 2 may comprise a gear pump or a combination of two or more gear pumps.

Figure 5:
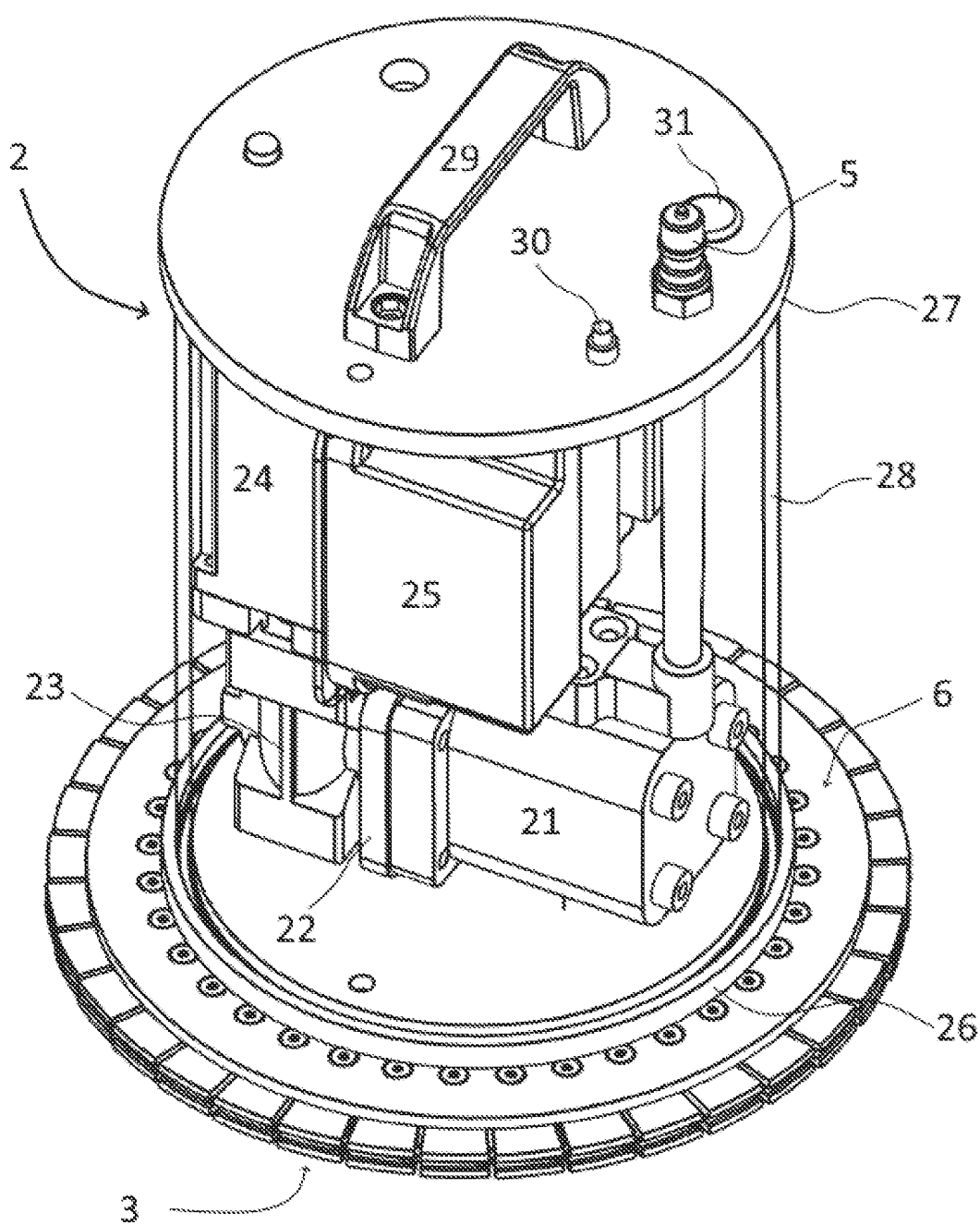
FIG. 5 discloses a second embodiment of a supply system according to the invention seen from above.

FIG. 5 discloses a side view of a second embodiment of an assembly comprising a pump unit 2 combined with a support unit 3. The pump unit 2 of the assembly comprises a pump 21, normally a positive displacement pump such as a gear pump, and an intermediate part 22 positioned between the pump 21 and a gear unit 23. The pump unit 2 further comprises a motor 24 which drives the pump 21 via the gear unit 23. The motor 24 may be an electric motor comprising a drive shaft and a frequency converter 25, and the pump unit 2 may optionally comprise a controller and a flow transmitter and/or a power supply which may supply 12 V, 24 V or 48 V.

The pump unit 2 may comprise a housing constituted of a top part or top plate 27, and/or a bottom part or bottom plate 26, and/or one or more side wall(s) 28. The housing may comprise a handle 29 attached to the top or to the side wall(s) of the housing which handle 29 makes it possible to carry the assembly.

In general, a pump unit 2 according to the invention may comprise an on/off switch 30 and/or a flow adjustment button for increasing or decreasing pumping volume positioned on the outside of the housing making it possible to start/stop and control pumping speed without the need to get access to the inside of the housing during normal operation.

FIG. 5 discloses a side view of the same embodiment of an assembly as disclosed in FIG. 5 from below. From this angle it is possible to see the second contact surface 7 of the support unit 3 which during operation faces and normally is in contact with the liquid to be pumped and the outlet 4 through which fluid is transferred from the fluid reservoir to the pump unit 2.

In general, the support unit 3 may during storing, i.e., before operation, provide a closure or cover or lid for a container 1. During emptying of the container 1 a pump unit 2 may then be placed on top of the support unit 3, and the support unit 3 may move towards the end part 9 while continuously being in contact with the fluid inside the container 1. This feature may increase the durability of the fluid as the fluid is kept in an oxygen free atmosphere as no or very little air is let into the opening of the container 1 as the opening is continuously covered by the support unit 3.

Figure 6:
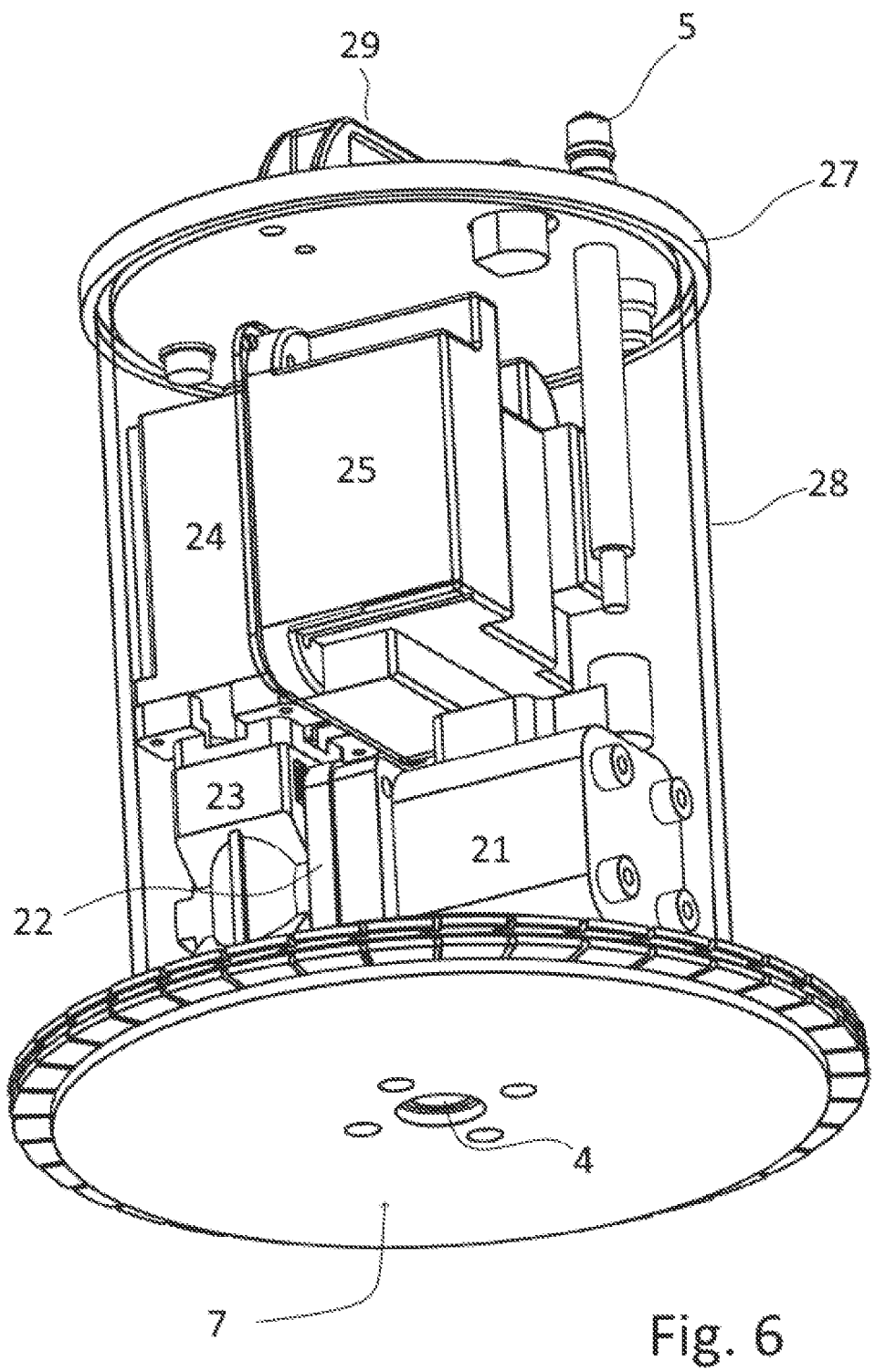
FIG. 6 discloses the second embodiment of a supply system according to the invention seen from below.

Electric wiring is not shown in FIGS. 5 and 6, but a skilled person would be able to combine the units of the pumping unit 2.

In general, the cross-section of the pump unit 2 or at least the cross-section of the lower part of the pump unit 2 is smaller than the cross-section of the support unit 3 in order for the assembly to move down through and into an inner volume of a container or other reservoir during pumping.

Optionally, the support unit 3 is attached releasably to the pump unit 2, where "attached releasably" means that the support unit 3 may be secured to the pump unit 2 and detached from the pump unit 2 before and after operation. When the support unit 3 is attached releasably to the pump unit 2, the support unit 3 may be replaced by an adapter for a standard cartridge, such an adapter is at a first end attached releasably to the pump unit 2 and at a second end attached to a standard cartridge. The standard cartridge may then constitute a container or other reservoir.

A standard cartridge normally contains 1.5, 3 or 5 kg of a viscous fluid such as grease. The adapter may comprise primary fastening means for fastening the adapter to the pump unit 2 e.g. corresponding threads, and secondary fastening means for fastening the adapter to a standardized cartridge, e.g., corresponding threads. Unlike the support unit 3, the adapter is not configured to the be in contact with the fluid surface in the cartridge as such, instead the upper surface or wall of the cartridge, i.e., the surface or wall closest to the pump unit 2, is in contact with the surface of fluid inside the cartridge and during operation the pump unit 2 may push this upper surface or wall against the fluid surface and thereby support the pumping function.

The primary fastening means of an adapter may be identical to the fastening means 8 of the support unit 3. This would make it possible to replace a bucket-type container 1 and a support unit 3 with a standard cartridge and an adapter.

The opening of a bucket-type container 1 may be configured with a round or polygonal or oval cross-section, and the outer perimeter of the support unit 3 may be configured with a corresponding round or polygonal or oval cross-section.

The supply system of the present invention may be used as a centralized lubrication system, e.g., in a wind turbine or the like.

| Ref. no. | Ref. name |
|---|---|
| 1 | Container for fluid |
| 2 | Pump unit |
| 3 | Support unit for pump |
| 4 | Outlet for fluid from support unit |
| 5 | Outlet for fluid from pump |
| 6 | First contact surface of support unit facing pump unit |
| 7 | Second contact surface of support unit facing fluid |
| 8 | Fastening means for pump unit |
| 9 | End part of container |
| 10 | Side wall of container |
| 11 | Upper centralized plate of support unit |
| 12 | Movable unit of support unit |
| 13 | Openings used for fixing pump unit to support unit |
| 14 | Lower centralized plate of support unit |
| 15 | Radially extending opening |
| 16 | Guiding means |
| 17 | Sealing mean (second spring) |
| 18 | First spring(s) |
| 19 | Tongue of movable unit |
| 20 | Groove of movable unit |
| 21 | Pump, normally a positive displacement pump e.g. a gear pump |
| 22 | Intermediate part |
| 23 | Gear unit |
| 24 | Motor |
| 25 | Frequency converter |
| 26 | Bottom part of pump unit |
| 27 | Top part of pump unit |
| 28 | Side wall of housing of pump unit |
| 29 | Handle for assembly |
| 30 | Stop/start switch |
| 31 | Controller switch |

The invention claimed is:

1. A supply system for pumping viscous fluid from a container (1) having an inner opening or inner volume, wherein the supply system comprises a pump unit (2) comprising a pump (21) for pumping the fluid out of the container (1), and the supply system further comprises a support unit (3) comprising an outlet (4) for fluid from the container (1),
a first contact surface (6) facing the pump unit (2) for contacting the pump unit (2) during operation,
fastening means (8) configured to fasten the support unit (3) to the pump unit (2) during operation,
a second contact surface (7) facing, and optionally for contacting the fluid inside the inner opening or the inner volume of the container (1) during operation,
wherein the support unit (3) is secured to the pump unit (2) such that the support unit and the pump unit (3, 2) move together, and the support unit (3) is movably mounted relative to the container (1) such that the support unit and the pump unit (3, 2) move relative to the container during operation, wherein the supply system during operation is arranged or configured with the pump unit (2) positioned on top of the container (1) so that gravity forces the pump unit (2) and the support unit (3) toward the fluid.

2. A supply system for pumping viscous fluid from a container (1) having an inner opening or inner volume, wherein the supply system comprises a pump unit (2) comprising a pump (21) for pumping the fluid out of the container (1), and the supply system further comprises a support unit (3) comprising an outlet (4) for fluid from the container (1),
a first contact surface (6) facing the pump unit (2) for contacting the pump unit (2) during operation,
fastening means (8) configured to fasten the support unit (3) to the pump unit (2) during operation,
a second contact surface (7) facing, and optionally for contacting the fluid inside the inner opening or the inner volume of the container (1) during operation,
wherein the support unit (3) is secured to the pump unit (2) such that the support unit and the pump unit (3, 2) move together, and the support unit (3) is movably mounted relative to the container (1) such that the support unit and the pump unit (3, 2) move relative to the container during operation, wherein the support unit (3) comprises a plurality of movable or displaceable units (12) between four and a hundred, or between eight and eighty, where each movable unit (12) is forceable into a forward position by an elastic force and forced toward a backward position by contact between each movable or displaceable unit (12) and a wall or walls of the inner volume of the container (1).

3. A supply system for pumping viscous fluid from a container (1) having an inner opening or inner volume, wherein the supply system comprises a pump unit (2) comprising a pump (21) for pumping the fluid out of the container (1), and the supply system further comprises a support unit (3) comprising an outlet (4) for fluid from the container (1),
a first contact surface (6) facing the pump unit (2) for contacting the pump unit (2) during operation,
fastening means (8) configured to fasten the support unit (3) to the pump unit (2) during operation,
a second contact surface (7) facing, and optionally for contacting the fluid inside the inner opening or the inner volume of the container (1) during operation,
wherein the support unit (3) is secured to the pump unit (2) such that the support unit and the pump unit (3, 2) move together, and the support unit (3) is movably mounted relative to the container (1) such that the support unit and the pump unit (3, 2) move relative to the container during operation, wherein the support unit (3) comprises a central part and a plurality of movable or displaceable units (12) positioned at or along a perimeter of the central part which movable or displaceable units (12) are movable in a radial direction relative to a center of the central part during operation thereby changing an outer periphery of the support unit (3) so as to increase or decrease in the radial direction during movement inside the container so as to keep an inner periphery of the container sealed.

4. The supply system according to claim 3, wherein the container (1) is a bucket-type container having an upward opening size that matches a cross-section of the inner opening or the inner volume of the container (1).

5. The supply system according to claim 3, wherein an outer perimeter of the support unit (3) corresponds to inner surfaces of the inner opening or the inner volume of the container (1) in shape and size.

6. The supply system according to claim 3, wherein the pump (21) is a positive displacement pump comprising an inlet for fluid corresponding to the outlet (4) of the support unit (3) and an outlet (5) for fluid.

7. The supply system according to claim 3, wherein the container (1) comprises an end part (9) and one side wall or a plurality of side walls (10) fixed to each other, wherein the end part (9) and side wall or the plurality of side walls together form the inner opening or inner volume for holding the viscous fluid, and the inner opening or inner volume may have either a constant cross-section through a complete length of the container or a varying cross-section in a direction from the outlet (4) to the end part (9).

8. The supply system according to claim 7, wherein a perimeter of the support unit (3) of the container (1) comprises guiding means dedicated to directing the support unit (3) from a start position at a first end of the side wall or the plurality of side walls (10) to a second or an opposite end of the side wall or the plurality of side walls (10).

9. The supply system according to claim 3, wherein the support unit (3) comprises a centralized lower plate (14) that comprises guiding means (16) adapted to fit corresponding guiding means (15) of each movable unit (12).

10. The supply system according to claim 3, wherein the fastening means (8) of the support unit (3) and the corresponding fastening means of the pump unit (2) together comprise either a manually releasable fastening means, or the fastening means (8) are un-releasable so that the support unit (3) and the pump unit (2) are manually inseparable.

11. The supply system according to claim 10, wherein the releasable fastening means comprises corresponding threads on respectively the support unit (3) and the pump unit (2), or the releasable fastening means comprises one or more corresponding openings in the pump unit (2) and the support unit (3) is joinable to the pump unit (2) by through-going bolts.

12. The supply system according to claim 3, wherein the pump unit (2) comprises a housing at least comprising one or more side walls (28) and a top part (27) forming an enclosure for enclosing the pump (21) and further motive and power equipment supporting the pump in pumping the fluid.

13. The supply system according to claim 12, wherein one or more switches or buttons for activating and controlling the pump (21) are positioned on a top part (27) of the housing.

14. A centralized lubrication system comprising a supply system according to claim 3.

* * * * *